US010792645B2

(12) United States Patent
Hosono et al.

(10) Patent No.: US 10,792,645 B2
(45) Date of Patent: Oct. 6, 2020

(54) TRANSITION-METAL-SUPPORTING INTERMETALLIC COMPOUND, SUPPORTED METALLIC CATALYST, AND AMMONIA PRODUCING METHOD

(71) Applicants: JAPAN SCIENCE AND TECHNOLOGY AGENCY, Kawaguchi-shi (JP); TOKYO INSTITUTE OF TECHNOLOGY, Meguro-ku (JP)

(72) Inventors: Hideo Hosono, Megro-ku (JP); Masaaki Kitano, Megro-ku (JP); Tomofumi Tada, Megro-ku (JP); Toshiharu Yokoyama, Megro-ku (JP); Yoshitake Toda, Megro-ku (JP); Yangfan Lu, Megro-ku (JP); Jiang Li, Megro-ku (JP)

(73) Assignees: JAPAN SCIENCE AND TECHNOLOGY AGENCY, Kawaguchi-shi (JP); TOKYO INSTITUTE OF TECHNOLOGY, Meguro-ku (JP)

( * ) Notice: Subject to any disclaimer, the term of this patent is extended or adjusted under 35 U.S.C. 154(b) by 144 days.

(21) Appl. No.: 16/065,381

(22) PCT Filed: Dec. 22, 2016

(86) PCT No.: PCT/JP2016/088393
§ 371 (c)(1),
(2) Date: Jun. 22, 2018

(87) PCT Pub. No.: WO2017/111028
PCT Pub. Date: Jun. 29, 2017

(65) Prior Publication Data
US 2018/0304237 A1 Oct. 25, 2018

(30) Foreign Application Priority Data

Dec. 25, 2015 (JP) ................................ 2015-254782

(51) Int. Cl.
| | |
|---|---|
| *B01J 23/46* | (2006.01) |
| *C01C 1/04* | (2006.01) |
| *B01J 37/02* | (2006.01) |
| *B01J 37/08* | (2006.01) |
| *B01J 35/00* | (2006.01) |
| *B01J 35/10* | (2006.01) |
| *B01J 23/10* | (2006.01) |
| *B01J 23/14* | (2006.01) |
| *B01J 23/63* | (2006.01) |
| *B01J 23/62* | (2006.01) |

(52) U.S. Cl.
CPC ............ *B01J 23/462* (2013.01); *B01J 23/10* (2013.01); *B01J 23/14* (2013.01); *B01J 35/002* (2013.01); *B01J 35/0006* (2013.01); *B01J 35/0073* (2013.01); *B01J 35/1009* (2013.01); *B01J 37/0207* (2013.01); *B01J 37/0209* (2013.01); *B01J 37/0225* (2013.01); *B01J 37/086* (2013.01); *C01C 1/04* (2013.01); *C01C 1/0411* (2013.01); *B01J 23/624* (2013.01); *B01J 23/63* (2013.01); *Y02P 20/52* (2015.11)

(58) Field of Classification Search
CPC .. B01J 23/462; B01J 35/0073; B01J 37/0209; B01J 35/1009; B01J 35/002; B01J 37/0225; B01J 37/086; B01J 37/0207; B01J 35/0006; B01J 23/14; B01J 23/10; B01J 23/624; B01J 23/63; C01C 1/04; C01C 1/0411; Y02P 20/52
See application file for complete search history.

(56) References Cited

U.S. PATENT DOCUMENTS

| | | | |
|---|---|---|---|
| 3,770,658 A | 11/1973 | Ozaki et al. | |
| 3,951,862 A | 4/1976 | Sze | |
| 6,040,087 A | 3/2000 | Kawakami | |
| 6,235,676 B1 | 5/2001 | Jacobsen et al. | |
| 6,329,101 B1 | 12/2001 | Kawakami | |
| 2004/0057891 A1 | 3/2004 | Nielsen et al. | |
| 2005/0079343 A1* | 4/2005 | Raybould | B23K 35/30 428/336 |

(Continued)

FOREIGN PATENT DOCUMENTS

| | | |
|---|---|---|
| EP | 0 034 403 A1 | 8/1981 |
| JP | 51-47674 B | 12/1976 |

(Continued)

OTHER PUBLICATIONS

Supplementary European Search Report dated Aug. 12, 2019 in European Patent Application No. 16878915.4, 8 pages.
Lu, Y., et al., "Water Durable Electride $Y_5Si_3$: Electronic Structure and Catalytic Activity for Ammonia Synthesis", Journal of the American Chemical Society, Mar. 30, 2016, vol. 138 No. 12, XP55600553, pp. 3970-3973.
Molnár, G.L., et al., "Interaction of copper metallization with rare-earth metals and silicides", Journal of Applied Physics, vol. 90 No. 1, Jul. 1, 2001, XP12053501, pp. 503-505.
International Search Report dated Feb. 21, 2017 in PCT/JP2016/088393.

(Continued)

*Primary Examiner* — Anthony J Zimmer
(74) *Attorney, Agent, or Firm* — Oblon, McClelland, Maier & Neustadt, L.L.P.

(57) ABSTRACT

An electride, which is more stable and can be more easily obtained, is provided or is made available, and as a result, a catalyst particularly useful for chemical synthesis, in which the electride is particularly used, is provided. A transition metal-supporting intermetallic compound having a transition metal supported on an intermetallic compound represented by the following formula (1): $A_5X_3$ ... (1) wherein A represents a rare earth element, and X represents Si or Ge.

8 Claims, 4 Drawing Sheets

(56) References Cited

U.S. PATENT DOCUMENTS

| | | | | |
|---|---|---|---|---|
| 2005/0111083 | A1* | 5/2005 | Yakshin | B82Y 10/00 359/359 |
| 2012/0020862 | A1 | 1/2012 | Coda et al. | |
| 2016/0361712 | A1 | 12/2016 | Hosono et al. | |

FOREIGN PATENT DOCUMENTS

| | | |
|---|---|---|
| JP | 54-37592 B1 | 11/1979 |
| JP | 56-149315 A | 11/1981 |
| JP | 59-16816 B2 | 4/1984 |
| JP | 2-258066 A | 10/1990 |
| JP | 4-364 B | 1/1992 |
| JP | 7-188066 A | 7/1995 |
| JP | 9-67601 A | 3/1997 |
| JP | 9-239272 A | 9/1997 |
| JP | 10-275631 A | 10/1998 |
| JP | 2000-264625 A | 9/2000 |
| JP | 2002-359230 A | 12/2002 |
| JP | 2004-35399 A | 2/2004 |
| JP | 2006-173490 A | 6/2006 |
| JP | 2006-231229 A | 9/2006 |
| JP | 2008-13435 A | 1/2008 |
| JP | 2012-520936 A | 9/2012 |
| JP | 2014-24712 A | 2/2014 |
| JP | 2016-515994 A | 6/2016 |
| WO | WO 2005/000741 A1 | 1/2005 |
| WO | WO 2010/105945 A1 | 9/2010 |
| WO | WO 2012/077658 A1 | 6/2012 |
| WO | WO 2014/034473 A1 | 3/2014 |
| WO | WO 2014/149757 A1 | 9/2014 |
| WO | WO 2015/129471 A1 | 9/2015 |

OTHER PUBLICATIONS

M. Ribeiro Gomes, et al., "Status of the MARE Experiment", IEEE Transactions on Applied Superconductivity, vol. 23, No. 3, Jun. 2013, 4 pages.

I.J. McColm, et al., "Hydrogen Sorption Properties of $D8_8$-type Systems: I. Hydrides of $Y_5Si_3$", Journal of the Less-Common Metals, vol. 115, No. 1, 1986, pp. 113-125.

I.J. McColm, et al., "Hydrogen Sorption Properties of $D8_8$-type Systems: IV. $Y_5Ge_3$ and $Y_5Si_3$-$Y_5Ge_3$ solid solutions", Journal of Alloys and Compounds, vol. 178, No. 1-2, 1992, pp. 91-100.

Masaaki Kitano, et al., "Electride support boosts nitrogen dissociation over ruthenium catalyst and shifts the bottleneck in ammonia synthesis", Nature Communications, vol. 6, Mar. 2015, pp. 1-9.

James L. Dye, "Electrons as Anions", Science, vol. 301, Aug. 1, 2003, pp. 607-608.

Satoru Matsuishi, et al., "High-Density Electron Anions in a Nanoporous Single Crystal: $[Ca_{24}Al_{28}O_{64}]^{4+}(4e^-)$", Science, vol. 301, Aug. 1, 2003, pp. 626-629 and cover sheet.

Masaaki Kitano, et al., "Ammonia synthesis using a stable electride as an electron donor and reversible hydrogen store", Nature, vol. 4, Nov. 2012, pp. 904-940.

Kimoon Lee, et al., "Dicalcium nitride as a two-dimensional electride with an anionic electron layer", Nature, vol. 494, Feb. 21, 2013, pp. 336-341.

Xiao Zhang, et al., "Two-Dimensional Transition-Metal Electride $Y_2C$", Chemistry of Materials, vol. 26, 2014, pp. 6638-6643.

V. Kotroczo, et al., "Hydrogen Sorption Properties of $D8_8$-Type Systems II: $Sc_5Si_3$ and $Y_5Si_3$-$Sc_5Si_3$ Solid Solutions", Journal of the Less-Common Metals, vol. 132, 1987, pp. 1-13.

\* cited by examiner

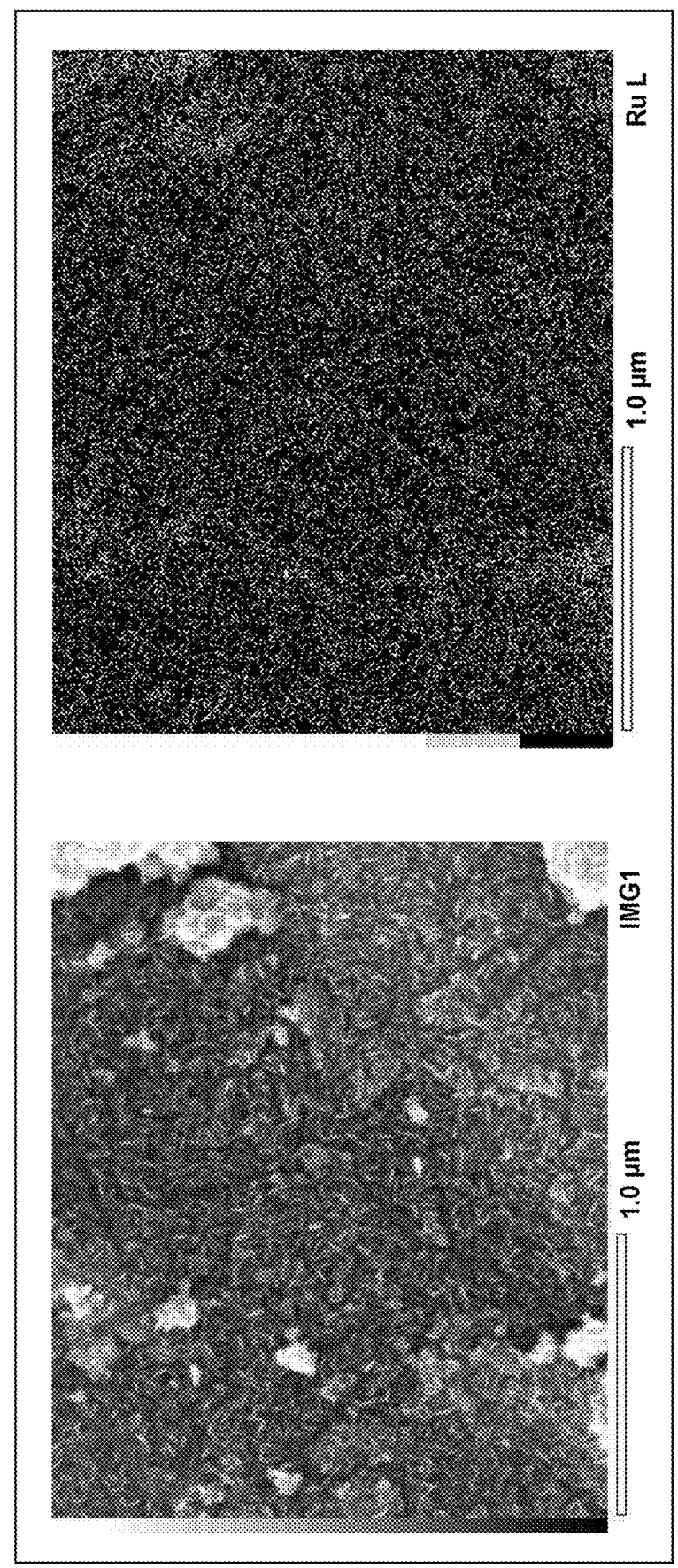
[Figure 1]

[Figure 2]
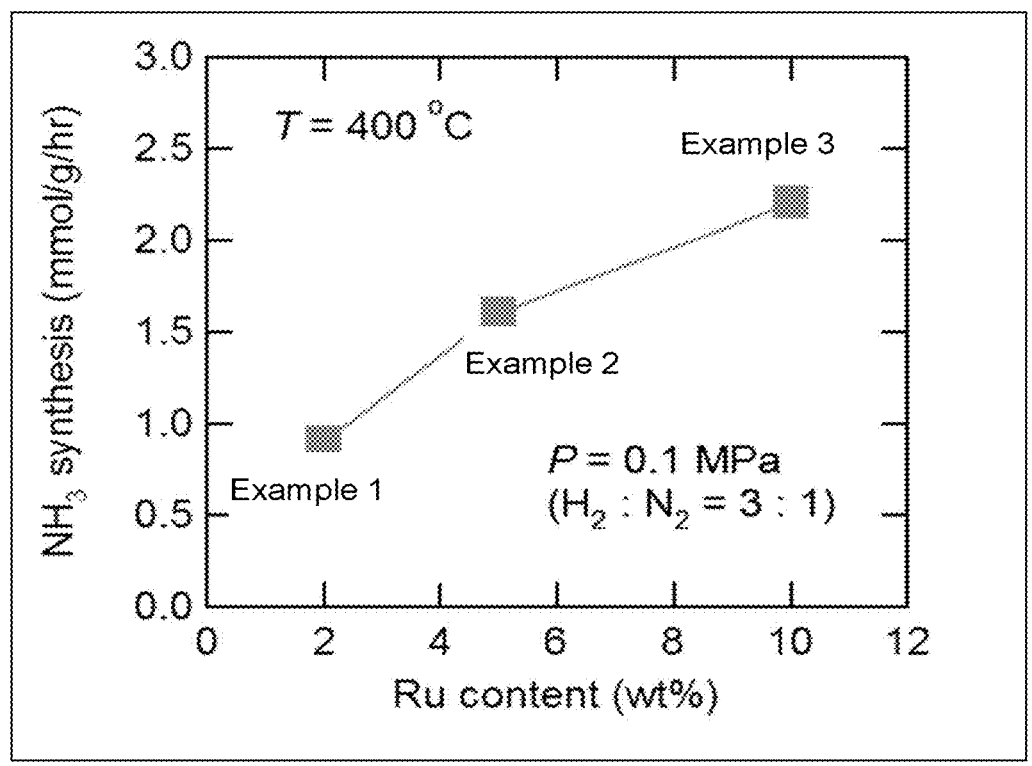

[Figure 3]
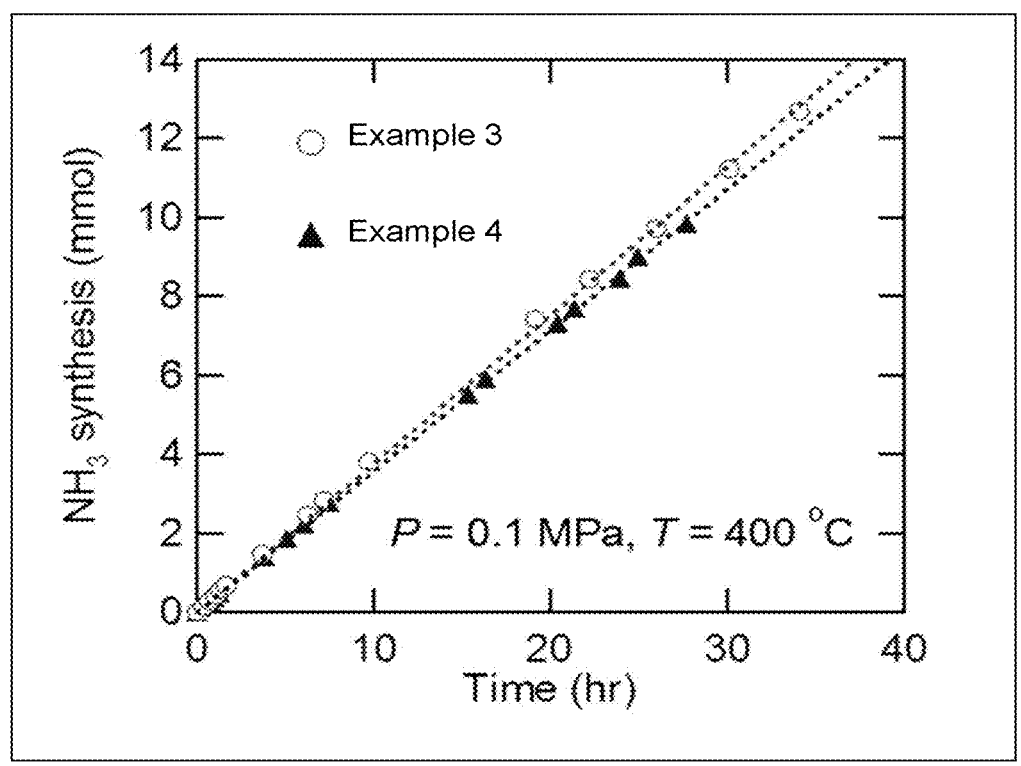

[Figure 4]
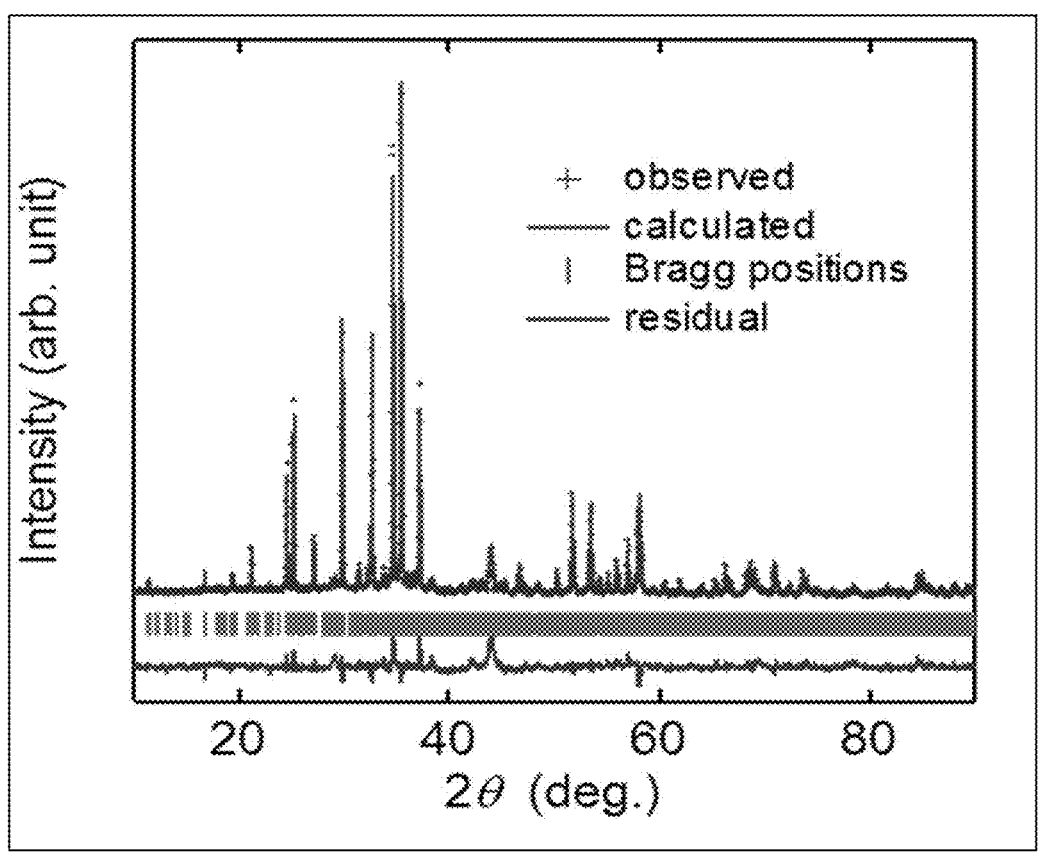

TRANSITION-METAL-SUPPORTING INTERMETALLIC COMPOUND, SUPPORTED METALLIC CATALYST, AND AMMONIA PRODUCING METHOD

TECHNICAL FIELD

The present invention relates to a transition metal-supporting intermetallic compound having a transition metal supported on an intermetallic compound, a supported metallic catalyst, and a method for producing ammonia using the catalyst.

BACKGROUND ART

In recent years, a substance called electride (also referred to as an electronic product) has been discovered (for example, Non Patent Literature 1). Electride is a substance in which electrons play as anions.

Since electrons contained in the electride do not belong to a specific orbit but are localized, the electrons have an electrical charge similar to that of monovalent anions and behave quantum-mechanically because of the small mass thereof. Thus, the physical properties of the electride have attracted attention. Specifically, because of the characteristics of the electride, such as high electron-donating ability caused by its low work function, the interest in the application of this substance has increased.

In 2003, the present inventor had found, for the first time, an electride, which is stable at an ordinary temperature, by using an inorganic compound called "mayenite-type compound" (Patent Literature 1 and Non Patent Literature 2).

The "mayenite-type compound" is calcium aluminosilicate comprising, as structural components, Ca, Al and O, which has the same type of crystal structure as a mayenite. The representative composition of the above described mayenite-type compound is represented by $12CaO.7Al_2O_3$, and this compound has a structure in which two oxygen atoms are subsumed as "free oxygens" in the space of a cage formed with the crystalline framework thereof.

The present inventor had found that the mayenite-type compound, free oxygens of which are substituted with electrons, is an electride (hereinafter referred to as C12A7 electride).

Moreover, in addition to the C12A7 electride, the present inventor also found electrides stable at an ordinary temperature, such as $Ca_2N$ (Patent Literature 2 and Non Patent Literature 4) and $Y_2C$ (Non Patent Literature 5), which are layered compounds. The present inventor had reported that, in these substances, electrons are stuck in a cage in the crystal structure thereof, or between the layers of the crystal.

It had been found that the electride discovered by the present inventor so far has a transition metal such as Ru supported thereon, so that it can be used as a catalyst, and in particular, as a catalyst having high ability to synthesize ammonia (Non Patent Literature 3 and Patent Literatures 3 and 4).

Specifically, a supported metallic catalyst having a transition metal such as Ru supported on a C12A7 electride (hereinafter also abbreviated as C12A7:e$^-$) is an advantageous catalyst in that it has high reaction activity under conditions of a lower reaction temperature and a lower reaction pressure than those of a Haber-Bosch process, which has been widely used as an ammonia synthesis method. Moreover, it had been also found that this supported metallic catalyst hardly undergoes hydrogen poisoning, which is problematic in conventional supported metallic catalysts used in ammonia synthesis.

On the other hand, intermetallic compounds such as $Y_5Si_3$ have been known. It has been known that these compounds have the property of absorbing hydrogen (for example, Non Patent Literatures 6 to 8). It had been reported that these intermetallic compounds are practically used as plasma-resistant members (Patent Literature 5) or ceramic members (Patent Literature 6).

CITATION LIST

Patent Literature

Patent Literature 1: International Publication No. WO2005/000741
Patent Literature 2: JP-A-2014-24712
Patent Literature 3: International Publication No. WO2012/077658
Patent Literature 4: International Publication No. WO2014/034473
Patent Literature 5: JP-A-2002-359230
Patent Literature 6: JP-A-2016-515994

Non Patent Literature

Non Patent Literature 1: J. L. Dye, Science 301 607-608 (2003)
Non Patent Literature 2: S. Matsuishi, Y. Toda, M. Miyatake, K. hayashi, T. Kamiya, M. Hirano, I. Tanaka and H. Hosono, Science 301, 626 (2003).
Non Patent Literature 3: M. Kitano, Y. Inoue, Y. Yamazaki, F. Hayashi, S. Kanbara, S. Matsuishi, T. Yokoyama, S. Kim, M. Hara and Hideo Hosono, Nature Chem. 4, 934 (2012)
Non Patent Literature 4: K. Lee, S. W. Kim, Y. Toda, S. Matsuishi and H. Hosono, Nature 494, 336 (2013).
Non Patent Literature 5: X. Zhang, Z. Xiao, H. Lei, Y. Tioda, S. Matsuishi, T. Kamiya, S. Ueda and H. Hosono, Chem. Mat. 26, 6638 (2014).
Non Patent Literature 6: I. J. McColm, V. Kotroczo and T. W. Button, J. Less-Common Metals 115, 113 (1986).
Non Patent Literature 7: V. Kotroczo, I. J. McColm and N. J. Clark, J. Less-Common Metal 132, 1 (1987).
Non Patent Literature 8: I. J. McColm and J. M. Ward, J. Alloys and Comp. 178, 91 (1992).

SUMMARY OF THE INVENTION

Technical Problem

However, the electride is problematic in terms of significant deficiency in chemical stability. The electride reported in Non Patent Literature 1 has been problematic in that it can be present only under a low-temperature condition (−40° C. or lower). Particularly, electrides, which are stable under an ordinary-temperature condition, have not yet been discovered.

C12A7:e$^-$ and $Ca_2N$ discovered by the present inventor, are stable at an ordinary temperature, but these substances are weak to oxygen or water. In particular, $Ca_2N$ easily reacts in the atmosphere to generate an oxide or a hydroxide.

Thus, the electride, which is problematic in terms of chemical stability, has a certain limit in a method of handling thereof. Further, when the electride is used as a catalyst as described above, it has high reaction activity, but at the same time, it is problematic in terms of reaction conditions and resistance to external environment.

That is to say, it has been continuously desired to develop a more chemically stable electride.

Also, all of the electrides have been problematic in terms of a complicated production method thereof. For example, since a method for producing the C12A7 electride comprises a plurality of heating steps, which are performed at a high temperature and in vacuum, the reaction operations are complicated, and the production method also has a great limitation in terms of production equipment.

That is to say, it has been desired to develop an electride, which can be more easily synthesized.

Meanwhile, the use of intermetallic compounds such as $Y_5Si_3$ as semiconductor materials or ceramics has been studied, but the direct use of the intermetallic compounds in chemical reactions has been hardly studied so far. In particular, since intermetallic compounds have been considered to be unsuitable materials in the field of catalytic chemistry because these compounds generally have a small specific surface area, in general, the intermetallic compounds have not been treated as research subjects.

It is an object of the present invention to provide or to make it available an electride, which is more stable and can be more easily obtained, and as a result, a catalyst particularly useful for chemical synthesis, in which the electride is particularly used, is provided.

Solution to Problem

As a result of intensive studies, the present inventors found that an intermetallic compound having a specific composition surprisingly has the properties of an electride, and that when a transition metal is supported on the intermetallic compound, the obtained intermetallic compound has excellent ability as a catalyst, as with the conventionally known electride.

Specifically, the present invention provides the following [1] to [8].

[1] A transition metal supported metal-supporting intermetallic compound having a transition metal supported on an intermetallic compound represented by the following formula (1):

$$A_5X_3 \qquad (1)$$

wherein A represents a rare earth element, and X represents Si or Ge.

[2] The transition metal supported metal-supporting intermetallic compound according to the above [1] wherein the work function of the intermetallic compound is 3.0 eV or more and 4.0 eV or less.

[3] The transition metal supported metal-supporting intermetallic compound according to the above [1] or [2], wherein the transition metal is at least one selected from the transition metals of group 8, group 9 or group 10 of the periodic table.

[4] The transition metal-supporting intermetallic compound according to any one of the above [1] to [3], wherein the ratio of the transition metal to the intermetallic compound is 0.1% by mass or more and 30% by mass or less.

[5] A supported metallic catalyst using the transition metal-supporting intermetallic compound according to any one of the above [1] to [4].

[6] A method for producing ammonia, comprising bringing the supported metallic catalyst according to the above [5] in contact with a mixed gas of hydrogen and nitrogen.

[7] The method for producing ammonia according to the above [6], wherein the reaction temperature applied when the supported metallic catalyst is brought in contact with the mixed gas is 200° C. or higher and 600° C. or lower.

[8] The method for producing ammonia according to the above [6] or [7], wherein the reaction pressure applied when the supported metallic catalyst is contacted with the mixed gas is 0.01 MPa or more and 20 MPa or less.

Effects of the Invention

Since the intermetallic compound used in the present invention can be synthesized by known common methods such as arc melting or a solid phase reaction method, the intermetallic compound can be produced more easily than the conventional electride. By allowing this intermetallic compound to support a transition metal compound, the resulting intermetallic compound can be used as a catalyst, as with the electride which has been discovered by the present inventor so far, and it can be used as a catalyst particularly suitable for ammonia synthesis.

Since the intermetallic compound used in the present invention is stable in water although it is an electride, a conventionally unknown electride having water resistance could be obtained for the first time. Accordingly, the transition metal-supporting intermetallic compound of the present invention can be utilized as a catalyst, regardless of external environment, such as a water content during the reaction or during the handling thereof, and further, the present transition metal-supporting intermetallic compound is also advantageous in terms of reaction operations or production equipment.

BRIEF DESCRIPTION OF DRAWINGS

FIG. 1 illustrates photographs substituted for figures, showing (a) an SEM image and (b) an EDS image of the transition metal-supporting intermetallic compound described in Example 1.

FIG. 2 is a graph showing the reaction results when the transition metal-supporting intermetallic compounds described in Examples 1, 2 and 3 were used as catalysts for ammonia synthesis.

FIG. 3 is a graph showing the reaction results when the transition metal-supporting intermetallic compounds described in Examples 3 and 4 were used as catalysts for ammonia synthesis.

FIG. 4 is a graph showing the powder XRD of a catalyst which has been used to synthesize ammonia for 30 hours in Example 1.

DESCRIPTION OF EMBODIMENTS

<Transition Metal-Supporting Intermetallic Compound>

In the transition metal-supporting intermetallic compound of the present invention, a transition metal is supported on an intermetallic compound represented by the following formula (1):

$$A_5X_3 \qquad (1)$$

wherein A represents a rare earth element, and X represents Si or Ge.

<Intermetallic Compound ($A_5X_3$)>

The intermetallic compound used in the present invention is a compound represented by $A_5X_3$ (1). The rare earth elements represented by A include Sc, Y, and lanthanide elements. Specific examples include Sc, Y, La, Ce, Pr, Nd, Sm, Gd, Tb, Dy, Ho, Er, Tm, Yb, and Lu.

Since the above described rare earth element is able to accumulate electrons in the 4f orbit although valence electrons (atomic number) increase, the rare earth element is characterized in that its physical properties such as free electrons or work function hardly change. That is to say, the properties of $A_5X_3$ generally do not depend on the type of the rare earth element A, as far as the crystal structure does not change. Among the rare earth elements, since Y, La and Ce have a high Clarke number and are relatively inexpensive, these rare earth elements are preferable. Among others, Y is further preferable because it provides a high activity of synthesizing ammonia particularly as a catalyst mentioned later.

Examples of X include Si and Ge. When A is La, Ce, Pr, Nd or Dy, X is preferably Ge. When A is a rare earth element other than La, Ce, Pr, Nd or Dy, X is preferably Si, because Si exhibits a particularly high Clarke number and can be inexpensively obtained.

Specific examples of the intermetallic compound represented by $A_5X_3$ include $Sc_5Si_3$, $Sc_5Ge_3$, $Y_5Si_3$, $Y_5Ge_3$, $La_5Ge_3$, $Ce_5Ge_3$, $Pr_5Ge_3$, $Nd_5Ge_3$, $Sm_5Si_3$, $Sm_5Ge_3$, $Gd_5Si_3$, $Gd_5Ge_3$, $Tb_5Si_3$, $Tb_5Ge_3$, $Dy_5Ge_3$, $Ho_5Si_3$, $Ho_5Ge_3$, $Er_5Si_3$, $Er_5Ge_3$, $Yb_5Si_3$, $Yb_5Ge_3$, $Lu_5Si_3$, and $Lu_5Ge_3$. Among these, $Sc_5Si_3$, $Sc_5Ge_3$, $Y_5Si_3$, $Y_5Ge_3$, $La_5Ge_3$, and $Ce_5Ge_3$ are preferable; in terms of relative inexpensiveness, $Y_5Si_3$, $Y_5Ge_3$, $La_5Ge_3$, and $Ce_5Ge_3$ are more preferable; in terms of a high activity of synthesizing ammonia particularly as a catalyst mentioned later, $Y_5Si_3$ and $Y_5Ge_3$ are further preferable; and in terms of higher activity of synthesizing ammonia, $Y_5Si_3$ is most preferable.

This $A_5X_3$ is an intermetallic compound having a $Mn_5Si_3$ type crystal structure, and has the performance of an electride. That is, $A_5X_3$, for example, $Y_5Si_3$ has a quasi-one-dimensional void with a diameter of approximately 4 Å in a lattice thereof, while it has a three-dimensional crystalline framework. The electronic state or physical properties of $A_5X_3$ had not been clarified for a long period of time. According to the calculation using density functional theory conducted by the present inventors, it has been demonstrated that the $A_5X_3$ is an electride having a limited anion electron density in a void thereof. Since these anion electrons do not have an interaction between onsite electrons and atomic nucleus, which are found in ordinary free electrons, the chemical potential of electrons becomes high, and as a result, a lower work function can be realized.

The work function of the intermetallic compound $A_5X_3$ used in the present invention is not particularly limited. In general, it is lower than that of the after-mentioned transition metal, and it is preferably 3.0 eV or more and 4.0 eV or less.

It is to be noted that the work function means minimum energy necessary for removing one electron from the surface of a substance, and that it generally indicates the energy gap between the vacuum level and the Fermi level. The work function of a transition metal is not particularly limited. The work function of a transition metal, which is preferable particularly when used as a catalyst mentioned later, is generally 4.5 eV or more and 5.5 eV or less. The work function of the above described $A_5X_3$ is sufficiently smaller than that of the after-mentioned transition metal, and the $A_5X_3$ has high electron-donating ability to the transition metal.

The above described $A_5X_3$ used in the present invention shows significantly chemical stability. Specifically, the $A_5X_3$ is stable not only in the atmosphere but also in water, and even after the $A_5X_3$ is exposed to water, its chemical properties do not change. The chemical stability of the above described $A_5X_3$ to water is significantly high, when compared with the above described C12A7:e⁻ or known other electrides. This is considered because anion electrons included in the above described $A_5X_3$ form chemical bonds with 4d electrons, thereby contributing to the improvement of chemical stability, in particular, the improvement of water resistance.

Since it is easy to preserve or handle the above described $A_5X_3$, the $A_5X_3$ can be used as an electride even in an environment in which it could not previously be used. That is to say, the above described $A_5X_3$ can be used as an electride even in the atmosphere or in an atmosphere containing water, in the field in which the use thereof has been proposed.

That is, the intermetallic compound $A_5X_3$ used in the present invention can be used as a reactant or a reaction promoter for supplying electrons contained in the structure thereof. Specifically, by using the intermetallic compound $A_5X_3$ together with a transition metal, for example, by a method of supporting a transition metal on the intermetallic compound, etc., the intermetallic compound $A_5X_3$ can be used as a reaction promoter which supplies electrons to the transition metal, and more specifically, the intermetallic compound $A_5X_3$ can be used as a material for a catalyst which supplies electrons. Moreover, the intermetallic compound $A_5X_3$ used in the present invention reacts with hydrogen, so that it can store the hydrogen as a hydride (H⁻) in the crystal structure thereof and also, it can reversibly release the hydride. That is to say, the above described $A_5X_3$ can also be used as a reaction promoter, which supplies electrons, reacts with the resulting hydrogen, stores it, and further, reversibly releases it.

The method of synthesizing $A_5X_3$ is not particularly limited, and $A_5X_3$ can be produced by a commonly used known method. Specifically, $A_5X_3$ is synthesized by a solid phase reaction method, or an arc melting method, or the like.

In the solid state reaction, the rare earth element represented by A is mixed with Si or Ge at a stoichiometric ratio, and the obtained mixture is then calcined. As such A and X, raw materials which can be generally used as A and X, such as powdery or massive materials, can be appropriately used. The calcination temperature is not particularly limited, and it is generally 1000° C. or higher, and preferably 1100° C. or higher, and also, it is generally 1200° C. or lower.

In the arc melting method, a mixture of A and X is melted under an argon atmosphere to obtain $A_5X_3$. Conditions applied to the arc melting method are not particularly limited. Conditions, which are generally used in a range in which the above described A and X are melted to form $A_5X_3$, can be appropriately selected and applied.

Since the obtained $A_5X_3$ is stable in the air or in water, this substance can be easily crushed and processed into various shapes, and then used. The crushing of $A_5X_3$ and processing into powders can be carried out, as appropriate, according to known methods. The crushing and processing into powders can be carried out, for example, using an agate mortar, a ball mill, etc.

The intermetallic compound represented by $A_5X_3$ may be a massive or powdery form, or may also be a molded body such as a porous body, a solid sintered body, or a thin film. The shape of a molded body is not particularly limited.

In the case of powders, the particle diameter is not particularly limited, and it is generally 100 nm or more and 10 μm or less.

The BET specific surface area of the intermetallic compound used in the present invention is not particularly limited. In general, it is preferably 1 m$^2$/g or more and 50 m$^2$/g or less.

<Transition Metal>

The metal supported on the above described intermetallic compound (1) is a transition metal. The transition metal may be a metal of group 4 to group 11 of the periodic table, and it is more preferably a metal of group 8, group 9 or group 10 of the periodic table. Specific examples of the transition metal include Fe, Co, Ni, Ru, Rh, Pd, Os, Ir, and Pt. Among these, Fe, Ru, Co, Rh, Ni, and Pd are more preferable, and Fe, Ru, Co, and Rh are further preferable. From the viewpoint of a transition metal particularly suitable for the after-mentioned catalyst for ammonia synthesis, Fe, Ru, and Co are still further preferable, and among these transition metals, from the viewpoint of a transition metal having the highest activity, Ru is most preferable. These transition metals can be used alone or in combination of two or more transition metals.

<Supporting of Transition Metal>

Supporting of the transition metal on the intermetallic compound (1) is not particularly limited, and it can be carried out by a known method. A transition metal or a compound used as a precursor of the transition metal (hereinafter referred to as a transition metal compound) is supported on the intermetallic compound. In general, there is applied a method which comprises supporting a compound of a transition metal to be used for supporting, which can be converted to a transition metal by reduction, thermal decomposition, etc., on the above described intermetallic compound, and then, converting the transition metal compound to a corresponding transition metal. The supporting of the transition metal on the intermetallic compound can be carried out, for example, by mixing the transition metal compound with the intermetallic compound (1), and then subjecting the obtained mixture to thermal decomposition.

The above described transition metal compound is not particularly limited, and thermally decomposable inorganic compounds of transition metals, or organic transition metal complexes, etc. can be used. Specific examples of the transition metal compound which can be used herein include transition metal complexes, transition metal oxides, and transition metal salts such as nitrate or hydrochloride.

Examples of the Ru compounds include triruthenium dodecacarbonyl [Ru$_3$(CO)$_{12}$], dichlorotetrakis(triphenylphosphine)ruthenium(II) [RuCl$_2$ (PPh$_3$)$_4$], dichlorotris(triphenylphosphine)ruthenium(II) [RuCl$_2$ (PPh$_3$)$_3$], tris(acetylacetonato)ruthenium(III) [Ru(acac)$_3$], ruthenocene [Ru (C$_5$H$_5$)], ruthenium nitrosyl nitrate [Ru(NO) (NO$_3$)$_3$], potassium ruthenate, ruthenium oxide, ruthenium nitrate, and ruthenium chloride.

Examples of the Fe compounds include pentacarbonyliron [Fe(CO)$_5$], dodecacarbonyltriiron [Fe$_3$(CO)$_{12}$], nonacarbonyliron [Fe$_2$(CO)$_9$], tetracarbonyliron iodide [Fe (CO)$_4$I], tris(acetylacetonato)iron(III) [Fe(acac)$_3$], ferrocene [Fe(C$_5$H$_5$)$_2$], iron oxide, iron nitrate, and iron chloride (FeCl$_3$).

Examples of the Co compounds include cobalt octacarbonyl [Co$_2$(CO)$_8$], tris(acetylacetonato)cobalt(III) [Co (acac)$_3$], cobalt(II) acetylacetonato [Co(acac)$_2$], cobaltocene [Co(C$_5$H$_5$)$_2$], cobalt oxide, cobalt nitrate, and cobalt chloride.

Among these transition metal compounds, carbonyl complexes of the transition metal, such as [Ru$_3$(CO)$_{12}$], [Fe (CO)$_5$], [Fe$_3$(CO)$_{12}$], [Fe$_2$(CO)$_9$], or [Co$_2$ (CO)$_8$], are supported on the intermetallic compound, and are then heated, so that the transition metal can be supported on the intermetallic compound. Accordingly, the carbonyl complexes of the transition metal are preferable because the after-mentioned reduction treatment can be omitted upon production of the transition metal-supporting intermetallic compound of the present invention.

The amount of the above described transition metal compound used is not particularly limited, and the transition metal compound can be used, as appropriate, in an amount necessary for realizing a desired amount supported. In general, the amount of the transition metal compound used is generally 0.01% by mass or more, preferably 0.05% by mass or more, and more preferably 0.1% by mass or more, and also, generally 30% by mass or less, preferably 20% by mass or less, and more preferably 15% by mass or less, based on the mass of the intermetallic compound used.

More specifically, the transition metal-supporting intermetallic compound can be produced by applying methods such as an impregnation method, a physical mixing method, a sputtering method, or a CVD method (chemical vapor deposition method).

As such an impregnation method, the following step can be adopted. For example, the above described intermetallic compound is added to a solution of the above described transition metal compound, followed by stirring the solution. The solvent used herein is not particularly limited, and water or various types of organic solvents can be used. In addition, the transition metal compound may be dissolved or dispersed in the solvent.

Subsequently, the obtained solution is heated in a flow of inert gas such as nitrogen, argon or helium, or in vacuum, so that it is solidified. The heating temperature applied herein is not particularly limited, and it is generally 50° C. or higher and 300° C. or lower. The heating time is not particularly limited, and it is generally 30 minutes or longer and 20 hours or shorter.

If the transition metal compound used herein is converted to a transition metal by thermal decomposition, the transition metal is generally supported on the intermetallic compound at this stage to obtain the transition metal-supporting intermetallic compound of the present invention (hereinafter also referred to as a "metal support of the present invention").

When a transition metal compound, which is not converted to a transition metal by thermal decomposition, is used, the dried and solidified transition metal compound is generally reduced to obtain the metal support of the present invention.

The method of reducing the above described transition metal compound (hereinafter referred to as a reduction treatment) is not particularly limited, as long as it does not inhibit the purpose of the present invention. Examples of the method of reducing the transition metal compound include a method of reducing the transition metal compound in an atmosphere containing reducing gas, and a method comprising adding a reducing agent such as NaBH$_4$, NH$_2$NH$_2$ or formalin to a solution containing the transition metal compound, and then depositing the transition metal compound on the surface of the intermetallic compound. Reduction is preferably carried out in an atmosphere containing reducing gas. Examples of the reducing gas include hydrogen, ammonia, methanol (vapor), ethanol (vapor), methane, and ethane.

Moreover, upon the above described reduction treatment, components other than the reducing gas may coexist in the reaction system, as long as the components do not inhibit the purpose of the present invention, in particular, the ammonia synthesis reaction. Specifically, upon the reduction treatment, gases such as argon or nitrogen, which do not inhibit the reaction, may coexist with reducing gas such as hydrogen, and nitrogen is preferably allowed to coexist.

When the reduction treatment is carried out in gas containing hydrogen, the reduction treatment can be carried out simultaneously with the after-mentioned ammonia production, by allowing nitrogen to coexist with hydrogen. That is to say, when the metal support of the present invention is used as a catalyst for ammonia synthesis mentioned later, the above described intermetallic compound having the above described transition metal compound supported thereon is placed under reaction conditions for the ammonia synthesis reaction, so that the transition metal compound may be reduced and may be converted to a transition metal.

The temperature applied during the reduction treatment is not particularly limited, and it is generally 200° C. or higher, and preferably 300° C. or higher, and also, it is generally 1000° C. or lower, and preferably 600° C. or lower. This is because the growth of the transition metal sufficiently occurs in a preferred range as a result of the reduction treatment performed in the above described temperature range.

The pressure applied during the reduction treatment is not particularly limited, and it is generally 0.01 MPa or more and 10 MPa or less. If the pressure applied during the reduction treatment is set at the same pressure as that under the after-mentioned ammonia synthesis conditions, complicated operations become unnecessary, and thus, it is advantageous in terms of production efficiency.

The time required for the reduction treatment is not particularly limited. When the reduction treatment is carried out under an ordinary pressure, the required time is generally 1 hour or longer, and preferably two hours or longer.

When the reduction treatment is carried out under a high reaction pressure, for example, at 1 MPa or more, the required time is preferably 1 hour or longer.

The physical mixing method is a method which comprises subjecting the above described intermetallic compound and the above described transition metal compound to solid-phase mixing, and then heating the obtained mixture in a flow of inert gas such as nitrogen, argon or helium, or in vacuum. The heating temperature and the heating time are the same as those in the above described impregnation method. By performing the reduction treatment, the metal support of the present invention can be obtained.

In the sputtering method, voltage is applied to ions, such as $Ar^+$, to accelerate them, and thereby, the ions are collided with the surface of the transition metal and the metal on the surface is then evaporated, so that the transition metal may be directly formed on the surface of the intermetallic compound.

In the CVD method, a transition metal complex is heated in vacuum, so that the transition metal complex is evaporated and is adhered to the intermetallic compound. Thereafter, the resulting compound is continuously heated in a reducing atmosphere or in vacuum, so that the transition metal compound is reduced, thereby obtaining a transition metal-supporting intermetallic compound. The reduction method is the same as the method applied in the above described reduction treatment.

The heating temperature is preferably 100 to 400° C.

<Transition Metal Supported Metal-Supporting Intermetallic Compound>

From the viewpoint of the catalytic activity of the transition metal-supporting intermetallic compound used as a supported metallic catalyst described later and costs, the ratio of the transition metal to the intermetallic compound (1) is preferably 0.1% by mass or more and 30% by mass or less. The ratio is more preferably 0.02% by mass or more, and further preferably 0.05% by mass or more, and also, it is more preferably 20% by mass or less, and even more preferably 10% by mass or less.

The BET specific surface area of the transition metal-supporting intermetallic compound of the present invention is preferably about 1 to 3 $m^2/g$. Besides, the BET specific surface area of the transition metal-supporting intermetallic compound generally becomes a value similar to the BET specific surface area of the above described intermetallic compound.

The degree of dispersion of the transition metal to be supported on $A_5X_3$, such as Ru, is not particularly limited, and it is generally 2.0% or more and 40% or less. The degree of dispersion (%) of the transition metal is a physical amount indicating the uniformity of a catalytically active metal on the surface of a base material, and as the degree of dispersion of the transition metal increases, it is more preferable. It is to be noted that, when the degree of dispersion was obtained, it was assumed that one CO molecule would be adsorbed on one Ru atom.

The transition metal-supporting intermetallic compound can be processed into a molded body by an ordinary molding technique, and then used. Specific examples of the shape of the molded body include granular, spherical, tablet-like, ring-like, macaroni-like, four-leaved, dice-like, and honeycomb-like shapes. Also, a supported body is coated with the transition metal-supporting intermetallic compound, and it can be then used.

The transition metal-supporting intermetallic compound of the present invention is an electride having strong electron-donating ability to the supported transition metal, and is stable in the atmosphere and in water. Accordingly, the present transition metal-supporting intermetallic compound is useful as various supported metallic catalysts.

That is to say, the supported metallic catalyst of the present invention is a supported metallic catalyst formed by supporting a transition metal on the intermetallic compound represented by the following formula (1):

$$A_5X_3 \qquad (1)$$

wherein A represents a rare earth element, and X represents Si or Ge.

With regard to the supported metallic catalyst of the present invention, the transition metal-supporting intermetallic compound of the present invention may be directly used in the reaction, or may also be molded, as necessary. Moreover, the present transition metal-supporting intermetallic compound may comprise components other than the above described intermetallic compound and the above described transition metal, unless the components impair the effects of the present invention. In general, it is preferable to directly use the metal support of the present invention.

With regard to components other than the intermetallic compound and the transition metal, the above described transition metal-supporting intermetallic compound may further comprise, as carriers of the intermetallic compound, $SiO_7$, $Al_2O_3$, $ZrO_2$, MgO, activated carbon, graphite, SiC and the likes.

The shape of the supported metallic catalyst of the present invention is not particularly limited, and it is the same as that of the above described transition metal-supporting intermetallic compound. The particle diameter of the supported metallic catalyst is not particularly limited, and it is generally 10 nm or more and 50 μm or less.

The particle diameter of the transition metal in the supported metallic catalyst of the present invention is not particularly limited, and it is generally 1 nm or more and 100 nm or less. The particle diameter of the transition metal is preferably 10 nm or less, and more preferably 5 nm or less, at which the number of step sites as active points of nitrogen dissociation increases.

The supported metallic catalyst of the present invention is useful as a catalyst for various types of hydrogenation reactions such as hydrogenation of organic compounds, hydrogen transfer, and hydrocracking, and is particularly useful as a catalyst for ammonia production. This is because the supported metallic catalyst of the present invention comprises the above described intermetallic compound having the properties of an electride in the configuration thereof, and because the supported metallic catalyst has strong electron-donating ability (low work function). In particular, when the supported metallic catalyst of the present invention is used as a catalyst for ammonia synthesis, it strongly promotes dissociation of nitrogen molecules. Accordingly, the supported metallic catalyst of the present invention is preferable as a catalyst for ammonia production.

<Production of Ammonia>

The method for producing ammonia of the present invention (hereinafter also referred to as the production method of the present invention) is a method which comprises using the supported metallic catalyst of the present invention as a catalyst, and reacting hydrogen with nitrogen on the above described catalyst to produce ammonia.

The specific production method is not particularly limited, as long as it is a method which comprises contacting hydrogen with nitrogen on the above described catalyst to synthesize ammonia, and ammonia can be produced, as appropriate, according to a known production method.

In the method for producing ammonia of the present invention, in general, when hydrogen is contacted with nitrogen on the above described catalyst, the catalyst is heated to produce ammonia.

The reaction temperature applied in the production method of the present invention is not particularly limited, and it is generally 200° C. or higher, preferably 250° C. or higher, and more preferably 300° C. or higher, and also, it is generally 600° C. or lower, preferably 500° C. or lower, and more preferably 450° C. or lower. Since the ammonia synthesis is an exothermic reaction, the reaction performed in a low temperature region is advantageous for ammonia generation, from the viewpoint of chemical equilibrium. However, in order to obtain a sufficient ammonia generation speed, the reaction is preferably carried out in the above described temperature range.

In the production method of the present invention, the molar ratio between nitrogen and hydrogen, which are contacted with the above described catalyst, is not particularly limited. In general, the ratio of hydrogen to nitrogen ($H_2/N_2$ (volume/volume)) is generally 0.4 or more, preferably 0.5 or more, and more preferably 1 or more, and also, it is generally 10 or less, and preferably 5 or less.

The reaction pressure applied in the production method of the present invention is not particularly limited, and the pressure of a mixed gas comprising nitrogen and hydrogen is generally 0.01 MPa or more, and preferably 0.1 MPa or more, and also, it is generally 20 MPa or less, preferably 15 MPa or less, and more preferably 10 MPa or less. Moreover, taking into consideration practical use, the reaction is preferably carried out under pressurized conditions, which are the atmospheric pressure or greater.

In the production method of the present invention, before nitrogen and hydrogen are contacted with the above described catalyst, water or oxides adhering to the catalyst are preferably removed from the catalyst, using hydrogen gas or the like. The removing method is, for example, a reduction treatment.

In the production method of the present invention, in order to obtain a high yield of ammonia, the water content in nitrogen and hydrogen used in the production method of the present invention is preferably small. The total water content in a mixed gas of nitrogen and hydrogen is not particularly limited, and it is generally 100 ppm or less, and preferably 50 ppm or less.

In the production method of the present invention, the form of a reaction vessel is not particularly limited, and a reaction vessel, which can be commonly used in the ammonia synthesis reaction, can be used herein. Specific examples of the reaction form, which can be used herein, include a batch-type reaction system, a closed circulation reaction system, and a flow-type reaction system. From the viewpoint of practical use, among these reaction systems, a flow-type reaction system is preferable. In addition, all of a single type of reactor filled with the catalyst, a method of connecting a plurality of reactors with one another, and a reactor having a plurality of reaction layers therein can be used.

Since the reaction of synthesizing ammonia from hydrogen and nitrogen is an exothermic reaction involving volume shrinkage, in order to increase the yield of ammonia, it is industrially preferable to remove the heat of reaction, and a commonly used, known reaction apparatus comprising a heat-removing means may be used. Specifically, there may be applied, for example, a method which comprises connecting, in series, a plurality of reactors, each of which is filled with the catalyst, and then establishing an intercooler at the outlet of each reactor to remove heat.

EXAMPLES

The present invention will be described in more detail based on the following Examples.

In the Examples, the amount of ammonia formed was measured by applying a method comprising supplying gas to a diluted sulfuric acid solution and then monitoring a fluctuation in the pH, a method comprising quantifying the generated ammonium ions by ion chromatography, etc.

(Method of Measuring BET Specific Surface Area)

The BET specific surface area was obtained by adsorbing nitrogen gas on the surface of an object at a liquid nitrogen temperature and then measuring it from an adsorption-desorption isothermal curve based on the adsorption and desorption of the nitrogen gas at −196° C. The analytical conditions are as follows.

[Measurement Conditions]

Measurement apparatus: high-speed specific surface/pore distribution measuring device BELSORP-mini 2 (manufactured by Microtrac BEL)

Adsorbed gas: 99.99995% by volume of nitrogen

Adsorption temperature: liquid nitrogen temperature of −196° C.

(Particle Diameter)

Measurement was carried out using a scanning electron microscope (hereinafter referred to as SEM) under the following conditions, and the size of the particle diameter was estimated.

[Measurement Conditions]

A powdery sample was attached onto a carbon tape and was then observed using SEM under the following conditions.

Measurement apparatus: JSM-7600F (manufactured by JEOL)
Measurement temperature: ordinary temperature
Reaction pressure: $1 \times 10^{-3}$ Pa or less (Degree of Dispersion)

The degree of dispersion was measured by a pulse adsorption method using carbon monoxide (CO). A mixed gas of carbon monoxide/helium was repeatedly introduced into the surface of an object in a pulsed manner, and the amount of carbon monoxide adsorbed was then obtained from a difference between the amount of carbon monoxide gas introduced and the amount thereof discharged. Thereafter, assuming that a single carbon monoxide molecule was chemically adsorbed on a single atom of the supported transition metal, the degree of dispersion was calculated from the above described amount of carbon monoxide adsorbed.

[Measurement Conditions]

Measurement apparatus: CO pulse method apparatus BELCAT-A, manufactured by Microtrac BEL
Adsorbed gas: mixed gas of carbon monoxide/helium (9.5% by volume of CO)
Adsorption temperature: 50° C.

(Work Function)

With regard to the measurement of the work function, the light energy dependency of photoelectrons was measured by applying ultraviolet photoelectron spectroscopy (UPS), and the work function was then estimated. Specifically, an object was irradiated with light in an energy region of 0 to 21 eV, and cutoff energy was then measured from the density of photoelectrons generated from the surface of the object, so that the work function was estimated.

[Measurement Conditions]

Measurement apparatus: ultraviolet photoelectron spectroscopic apparatus DA30, manufactured by Scienta Omicron
Measurement pressure: $1 \times 10^{-8}$ Pa or less
Measurement temperature: ordinary temperature Example 1

<Preparation of $Y_5Si_3$ and $Y_5Ge_3$>

1.62 g (18.2 mmol) of Yttrium (manufactured by Kojundo Chemical Lab. Co., Ltd.; granular, purity: 99.9%) and 0.311 g (10.9 mmol) of silicon (manufactured by Kojundo Chemical Lab. Co., Ltd.; purity: 99.999%) were each weighed, and these substances were then subjected to arc melting in an argon atmosphere to synthesize $Y_5Si_3$. The obtained $Y_5Si_3$ had a massive structure, the mass thereof was 1.9 g, and the mass loss was 1.9% by mass.

The obtained massive $Y_5Si_3$ was crushed under an argon atmosphere, using an agate mortar, to prepare powdery $Y_5Si_3$. The surface area of the obtained powdery $Y_5Si_3$ was 1 $m^2/g$, and the particle diameter thereof was distributed from 100 nm to 10 μm. The specific surface area of $Y_5Si_3$ was obtained according to the above described method of measuring a BET specific surface area. Moreover, the particle diameter thereof was obtained by observation using SEM (FIG. 1a).

The work function of the obtained $Y_5Si_3$, which was measured by the above described method, was 3.5 eV.

<Support of Metal on $Y_5Si_3$>

0.72 g of the powdery $Y_5Si_3$ obtained by the above described method and 0.033 g of $Ru_3(CO)_{12}$ (manufactured by Aldrich, 99%) (corresponding to 2% by mass of the metal Ru to be supported on $Y_5Si_3$) were inserted into a silica glass tube, and were then heated in vacuum at 70° C. for 1 hour. Thereafter, the substances were continuously heated at 120° C. for 1 hour, so that $Ru_3(CO)_{12}$ was allowed to adhere onto the surface of the powdery $Y_5Si_3$. Finally, the substances were heated at 250° C. for 2 hours to thermally decompose $Ru_3(CO)_{12}$, thereby obtaining a supporting product in which Ru was supported on $Y_5Si_3$ (hereinafter referred to as $Ru/Y_5Si_3$) (FIG. 1b).

The specific surface area of the above described $Ru/Y_5Si_3$ was 1 $m^2/g$, and the degree of dispersion obtained by a pulse CO adsorption method was 2.2%.

<Ammonia Synthesis Reaction>

Using the above described $Ru/Y_5Si_3$ as a catalyst, this catalyst was contacted with a mixed gas of nitrogen and hydrogen, so as to perform an ammonia synthesis reaction. That is, 0.2 g of the above described $Ru/Y_5Si_3$ was filled into a quartz glass tube, and the reaction was then carried out using a flow type fixed bed reactor. The water concentrations of nitrogen gas and hydrogen gas used as raw materials were a detection limit or less. The flow rates of the raw material gases during this reaction were 15 mL/min (nitrogen) and 45 mL/min (hydrogen) (60 mL/min in total). In addition, during this reaction, the reaction pressure was the atmospheric pressure (0.1 MPa), the reaction temperature was 400° C., and the reaction time was 30 hours. The ammonia formation rate during the ammonia synthesis reaction was measured over time by chromatography. As a result, the ammonia formation rate was 0.9 mol/g·hr, and the activation energy was 48 kJ/mol. The results are shown in Table 1 and Table 2.

Moreover, after completion of the ammonia synthesis reaction, the XRD of the catalyst used in the reaction was measured. The results are shown in FIG. 4.

Example 2

The supported product $Ru/Y_5Si_3$ was prepared in the same manner as that of Example 1 with the exception that the amount of the metal Ru supported on $Ru/Y_5Si_3$ in Example 1 was set to 5% by mass. The specific surface area of the obtained supported product was 2 $m^2/g$, and the degree of dispersion thereof was 2.4%.

Using this supported product as a catalyst, the ammonia synthesis reaction was carried out under the same conditions as those of Example 1. The ammonia formation rate was 1.6 mmol/g·hr, and the activation energy was 50 kJ/mol. The results are shown in Table 1.

Example 3

The supported product $Ru/Y_5Si_3$ was prepared in the same manner as that of Example 1 with the exception that the amount of the metal Ru supported on $Ru/Y_5Si_3$ in Example 1 was set to 10% by mass. The specific surface area of the obtained supported product was 3 $m^2/g$ and the degree of dispersion thereof was 2.8%.

Using this supported product as a catalyst, the ammonia synthesis reaction was carried out under the same conditions as those of Example 1. The ammonia formation rate was 12 mmol/g·hr, and the activation energy was 52 kJ/mol. The results are shown in Table 1, Table 2, and FIG. 3.

Example 4

The powdery $Y_5Si_3$ obtained by the same method as that of Example 1 was immersed in water for 1 hour, and water was then dried. Thereafter, the supported product $Ru/Y_5Si_3$ having 10% by mass of the supported metal Ru was prepared in the same manner as that of Example 3.

Using this supported product as a catalyst, the ammonia synthesis reaction was carried out under the same conditions as those of Example 1. The ammonia formation rate was 1.9 mmol/g·hr, which was a value almost equivalent to that of Example 3, in which a water treatment was not carried out. The results are shown in FIG. 3.

Example 5

An ammonia synthesis reaction was carried out under the same conditions as those of Example 3 with the exception that the reaction pressure was changed to 0.3 MPa. The ammonia formation rate was 2.6 mmol/g·hr. The results are shown in Table 2.

Example 6

An ammonia synthesis reaction was carried out under the same conditions as those of Example 3 with the exception that the reaction pressure was changed to 0.5 MPa. The ammonia formation rate was 3.3 mmol/g·hr. The results are shown in Table 2.

Example 7

An ammonia synthesis reaction was carried out under the same conditions as those of Example 3 with the exception that the reaction pressure was changed to 1.0 MPa. The ammonia formation rate was 3.8 mmol/g·hr. The results are shown in Table 2.

Example 8

0.88 g (10.0 mmol) of Yttrium (manufactured by Kojundo Chemical Lab. Co., Ltd.; granular; purity: 99.9%) and 0.44 g of germanium (manufactured by Kojundo Chemical Lab. Co., Ltd.; purity: 99.99%) were each weighed, and these substances were then subjected to arc melting in the same manner as that of Example 1 to obtain 1.3 g of massive $Y_5Ge_3$. The mass loss caused by arc melting was 3.9%.

The obtained massive $Y_5Ge_3$ was crushed in the same manner as that of Example 1 to prepare powdery $Y_5Ge_3$. The specific surface area of the obtained powdery $Y_5Ge_3$ was 1 $m^2/g$.

The work function of the obtained $Y_5Ge_3$, which was obtained by the above described method, was 3.5 eV.

According to the same method as that of Example 1, the metal Ru was supported on $Y_5Ge_3$, so that the amount of the metal Ru could be 2% by mass with respect to $Y_5Ge_3$, thereby preparing a supported product $Ru/Y_5Ge_3$.

An ammonia synthesis reaction was carried out under the same conditions as those of Example 1 with the exception that the above described $Ru/Y_5Ge_3$ was used as a catalyst. The ammonia formation rate was 1.5 mmol/g·hr.

Comparative Example 1

2 g of MgO was dispersed in tetrahydrofuran (THF) (60 mL) in which $Ru_3(CO)_{12}$ had been dissolved, followed by evaporation to dryness, and the resultant was then heated in vacuum at 450° C. to obtain a supported product in which 2° by mass of Ru was supported on MgO (hereinafter referred to as Ru/MgO). Thereafter, the above described Ru/MgO was mixed with $CsCO_3$, so that the molar ratio of Cs atoms/Ru atoms could be 1, and the mixture was then dispersed in ethanol. After the mixed solution had been stirred for 4 hours, the solvent was subjected to evaporation to dryness, thereby preparing a Cs-added Ru catalyst (hereinafter referred to as Cs—Ru/MgO).

The BET specific surface area of the above described Cs—Ru/MgO was 12 $m^2/g$. In addition, the degree of dispersion was 18.6%.

An ammonia synthesis reaction was carried out under the same conditions as those of Example 1 with the exception that the above described Cs—Ru/MgO was used as a catalyst. The ammonia formation rate at 400° C. was 3.4 mmol/g·hr, and the activation energy was 73 kJ/mol. The results are shown in Table 1.

Comparative Example 2

Activated carbon (BET surface area: 310 $m^2/g$) was used instead of the $Y_5Si_3$ of Example 1. $Ru_3(CO)_{12}$ was dissolved in THF, and it was then supported on the activated carbon, so that the supported amount of the metal Ru became 9.1% by mass. Thereafter, the resultant was immersed in $Ba(NO_3)_2$ to prepare a supported product, in which Ba was supported on Ru/C at a Ba/Ru atomic ratio of 1 (hereinafter referred to as Ba—Ru/C). The BET specific surface area of the above described Ba—Ru/C was 310 $m^2/g$. In addition, the degree of dispersion was 14.3%. An ammonia synthesis reaction was carried out under the same conditions as those of Example 1 with the exception that the above described Ba—Ru/C was used as a catalyst. The ammonia formation rate at 400° C. was 2.2 mmol/g·hr, and the activation energy was 73 kJ/mol. The results are shown in Table 1.

Comparative Example 3

A supported product, in which 1.5% by mass of the metal Ru was supported on CaO (hereinafter referred to as Ru/CaO), was prepared by the same method as that of Example 1, with the exceptions that CaO was used instead of the $Y_5Si_3$ of Example 1, and that the amount of the metal Ru supported on CaO was set to 1.5% by mass. The BET specific surface area of the above described Ru/CaO was 3 $m^2/g$. In addition, the degree of dispersion was 4.9%. An ammonia synthesis reaction was carried out under the same conditions as those of Example 1 with the exception that the above described Ru/CaO was used as a catalyst. The ammonia formation rate at 400° C. was 0.2 mmol/g·hr, and the activation energy was 120 kJ/mol. The results are shown in Table 1.

Comparative Example 4

A supported product, in which 6.0% by mass of the metal Ru was supported on $Al_2O_3$ (hereinafter referred to as $Ru/Al_2O_3$), was prepared by the same method as that of Example 1, with the exceptions that $Al_2O_3$ was used instead of the $Y_5Si_3$ of Example 1, and that the amount of the metal Ru supported on $Al_2O_3$ was set to 6.0% by mass. The BET specific surface area of the above described $Ru/Al_2O_3$ was 170 $m^2/g$. In addition, the degree of dispersion was 12.5%. An ammonia synthesis reaction was carried out under the same conditions as those of Example 1 with the exception that the above described $Ru/Al_2O_3$ was used as a catalyst. The ammonia formation rate at 400° C. was 0.1 mmol/g·hr, and the activation energy was 64 kJ/mol. The results are shown in Table 1.

Comparative Example 5

A conductive mayenite-type compound (C12A7:e⁻) was synthesized in accordance with the method described in Example 1 of WO2012/077658. As a mayenite-type compound, a mayenite-type compound having a molar ratio between Ca atoms and Al atoms of 11:14 was synthesized, and then, the above described C12A7:e⁻ corresponding to this compound was obtained. The conduction electron concentration of the above described C12A7:e⁻ was $2 \times 10^{21}$ cm⁻³.

A supported product, in which Ru was supported on C12A7:e⁻ (hereinafter referred to as Ru/C12A7:e⁻), was prepared under the same conditions as those of Example 1, with the exceptions that the obtained C12A7:e⁻ was used, and that the amount of Ru supported was set to 4° by mass. The BET specific surface area of the above described Ru/C12A7:e⁻ was 1.0 m²/g. In addition, the degree of dispersion was 2.0%. An ammonia synthesis reaction was carried out under the same conditions as those of Example 1 with the exception that the above described Ru/C12A7:e⁻ was used as a catalyst. The ammonia formation rate at a reaction temperature of 400° C. was 2.1 mmol/g·hr, and the activation energy was 56 kJ/mol. The results are shown in Table 1.

FIG. 2 shows the dependency of the ammonia formation rate on the amount of Ru supported, in an ammonia synthesis reaction in which Ru/Y₅Si₃ was used as a catalyst. The ammonia formation rate increased with an increase in the amount of Ru supported on Y₅Si₃, the reaction efficiency was improved, and Ru/Y₅Si₃ supporting 10% by mass of Ru showed the highest formation rate.

FIG. 3 shows the time dependency of an ammonia synthesis reaction in which Ru/Y₅Si₃ was used as a catalyst. In the ammonia synthesis reaction using this catalyst, even if 30 hours or more have passed after initiation of the reaction, the catalytic activity was not attenuated, and high chemical stability was exhibited.

Moreover, as described in Example 4, even though Y₅Si₃ was exposed to water, Ru was then supported on Y₅Si₃, and Ru/Y₅Si₃ was then used as a catalyst, its catalytic activity was not lost. A majority of catalysts, which have conventionally been used in ammonia synthesis reactions, comprises the oxides of alkaline metals or the oxides of alkaline-earth metals. Accordingly, the conventional catalysts have vulnerability to water. Among a majority of ammonia synthesis catalysts, Y₅Si₃ has outstanding chemical stability.

FIG. 4 shows a chart of the powder XRD of Ru/Y₅Si₃, after an ammonia synthesis reaction was carried out for 30 hours. The obtained Bragg peaks were all derived from hydrogen absorbed Y₅Si₃ and the Ru metal. From the results of the powder XRD, decomposition of Y₅Si₃ and the chemical reaction with the metal Ru were not confirmed, and thus, it is concluded that Ru/Y₅Si₃ acts as a catalyst in ammonia synthesis.

TABLE 1

| | Catalyst | Specific surface area [m²/g] | Amount of Ru supported [% by mass] | Degree of dispersion [%] | NH₃ formation rate [mmol/g · hr] | TOF [sec⁻¹] | Activation energy $E_a$ [KJ/mol] |
|---|---|---|---|---|---|---|---|
| Example 1 | Ru/Y₅Si₃ | 1 | 2 | 2.2 | 0.9 | 0.06 | 48 |
| Example 2 | Ru/Y₅Si₃ | 2 | 5 | 2.4 | 1.6 | 0.04 | 50 |
| Example 3 | Ru/Y₅Si₃ | 3 | 10 | 2.8 | 2.2 | 0.02 | 52 |
| Comparative Example 1 | Cs—Ru/MgO | 12 | 6 | 18.6 | 3.4 | 0.008 | 73 |
| Comparative Example 2 | Ba—Ru/activated carbon | 310 | 9.1 | 14.3 | 2.2 | 0.003 | 73 |
| Comparative Example 3 | Ru/CaO | 3 | 1.5 | 4.9 | 0.2 | 0.006 | 120 |
| Comparative Example 4 | Ru/Al₂O₃ | 170 | 6 | 12.5 | 0.1 | 0.0002 | 64 |
| Comparative Example 5 | Ru/C12A7:e⁻ | 1 | 4 | 2.0 | 2.1 | 0.08 | 56 |

TABLE 2

| | Catalyst | Amount of Ru supported [% by mass] | Reaction pressure [MPa] | NH₃ formation rate [mmol/g · hr] |
|---|---|---|---|---|
| Example 1 | Ru/Y₅Si₃ | 2 | 0.1 | 0.9 |
| Example 3 | Ru/Y₅Si₃ | 10 | 0.1 | 2.2 |
| Example 5 | Ru/Y₅Si₃ | 10 | 0.3 | 2.6 |
| Example 6 | Ru/Y₅Si₃ | 10 | 0.5 | 3.3 |
| Example 7 | Ru/Y₅Si₃ | 10 | 1.0 | 3.8 |

Table 1 shows a comparison made between Ru/Y₅Si₃ used as catalysts and Ru-supported catalysts formed by supporting Ru on known carriers. The ammonia formation rate of Ru/Y₅Si₃ was almost equivalent to that of the known Ru-supported catalyst, although Ru/Y₅Si₃ had a smaller surface area than the known Ru-supported catalyst. In addition, the reaction activation energy of Ru/Y₅Si₃ tended to be small. From these results, it is considered that Ru/Y₅Si₃ enables the synthesis of ammonia in a relatively low temperature region.

The specific reaction mechanism of using Ru/Y₅Si₃ as a catalyst has not been clarified. Taking into consideration, for example the facts that the work function of Y₅Si₃ is significantly smaller than that of a transition metal such as Ru, and that Y₅Si₃ has a high density of free carriers, it is considered that the activation energy for the dissociation of nitrogen molecules has been reduced.

In fact, since the activation energy for ammonia synthesis using Ru/Y₅Si₃ as a catalyst is almost equivalent to that for ammonia synthesis using the Ru/C12A7:e– catalyst, it is assumed that the reaction progresses based on the same mechanism. That is to say, it is considered that the dissociation of nitrogen molecules is not in a rate-determining step, but that the formation of the nitrogen-hydrogen bond in ammonia is in a rate-determining step. Moreover, when Ru/Y₅Si₃ is used as an ammonia synthesis catalyst, the amount of ammonia synthesized does not become saturated even under high pressure conditions.

The intermetallic compound used in the present invention has the properties of an electride, and electrons contained in the structure thereof react with hydrogen generated as a result of a catalytic reaction, so that the intermetallic compound can store hydrogen as hydride (H⁻) in the crystal structure thereof, and also, can release the hydride reversibly. Accordingly, it is considered that the intermetallic compound used in the present invention can suppress hydrogen poisoning.

The invention claimed is:

1. A transition metal-supporting intermetallic compound having a transition metal supported on an intermetallic compound represented by the following formula (1):

$$A_5X_3 \qquad (1)$$

wherein:
A represents a rare earth element; and
X represents Si or Ge,
wherein a ratio of the transition metal to the intermetallic compound is 0.1% by mass or more and 30% by mass or less.

2. The transition metal-supporting intermetallic compound according to claim 1, wherein the work function of the intermetallic compound is 3.0 eV or more and 4.0 eV or less.

3. The transition metal-supporting intermetallic compound according to claim 1, wherein the transition metal is at least one selected from the group consisting of transition metals of group 8, group 9 and group 10 of the periodic table.

4. A supported metallic catalyst, comprising the transition metal-supporting intermetallic compound according to claim 1.

5. A method for producing ammonia, the method comprising contacting a supported metallic catalyst with a mixed gas of hydrogen and nitrogen,
wherein the supported metallic catalyst comprises a transition metal-supporting intermetallic compound, and
the transition metal-supporting intermetallic compound has a transition metal supported on an intermetallic compound represented by the following formula (1):

$$A_5X_3 \qquad (1),$$

wherein:
A represents a rare earth element; and
X represents Si or Ge.

6. The method according to claim 5, wherein a reaction temperature applied when the supported metallic catalyst is contacted with the mixed gas is 200° C. or higher and 600° C. or lower.

7. The method according to claim 5, wherein a reaction pressure applied when the supported metallic catalyst is brought in contact with the mixed gas is 0.01 MPa or more and 20 MPa or less.

8. The transition metal-supporting intermetallic compound according to claim 1, wherein the transition metal is an elemental transition metal.

* * * * *